Figure 1:
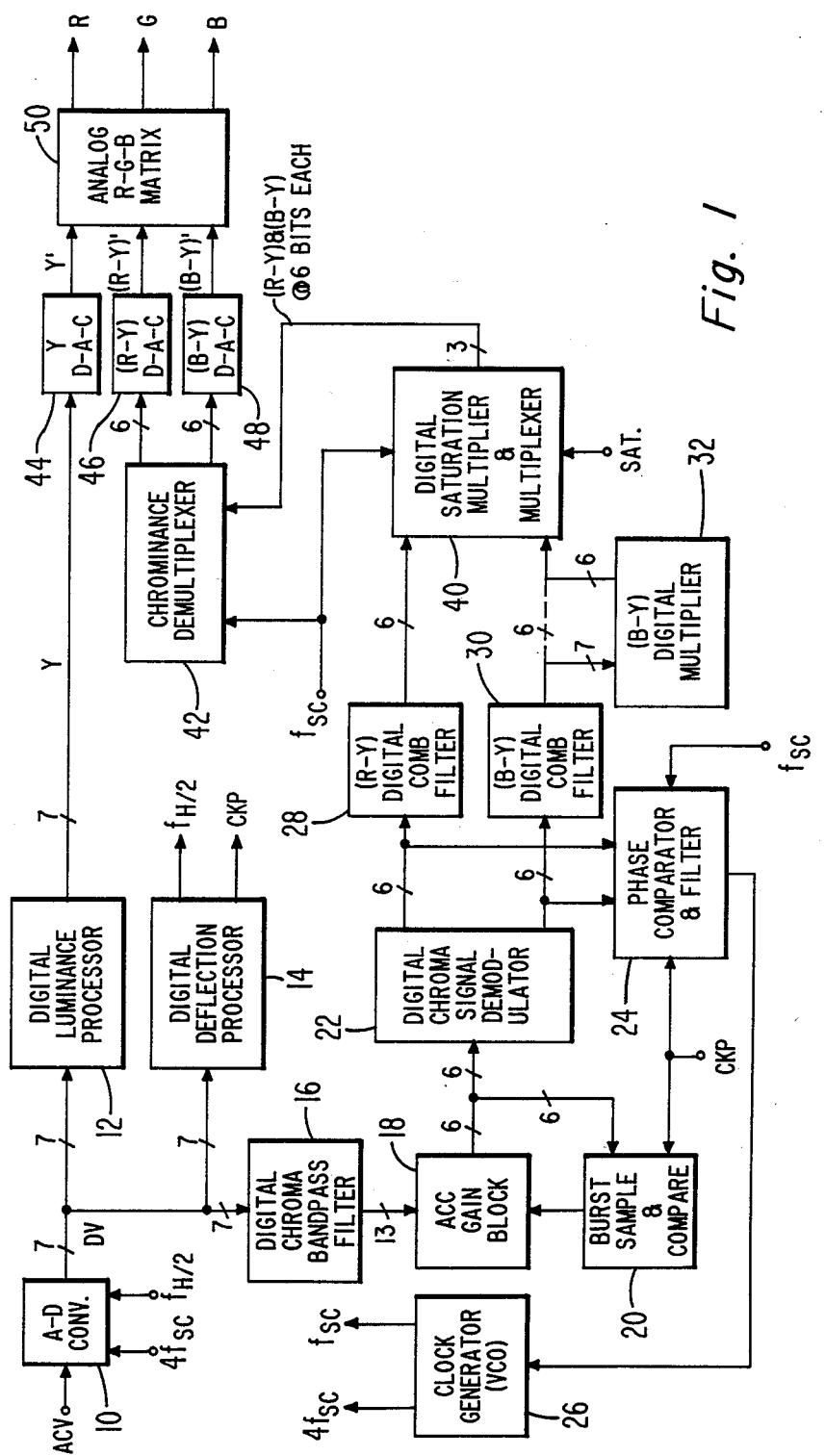
Figure 2:
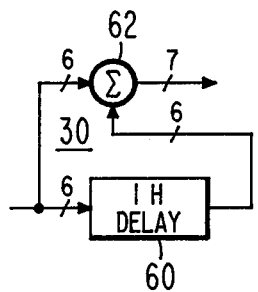

United States Patent [19]

Willis

[11] Patent Number: 4,556,900
[45] Date of Patent: Dec. 3, 1985

[54] SCALING DEVICE AS FOR QUANTIZED B-Y SIGNAL

[75] Inventor: Donald H. Willis, Indianapolis, Ind.

[73] Assignee: RCA Corporation, Princeton, N.J.

[21] Appl. No.: 498,016

[22] Filed: May 25, 1983

[51] Int. Cl.[4] .................... H04N 9/50; H04N 9/32; H04N 5/21; H04N 9/52
[52] U.S. Cl. .................................... 358/23; 358/13; 358/36; 358/30; 358/27
[58] Field of Search .................... 358/23, 27, 29, 30, 358/13, 36, 316, 315; 375/18, 26, 38; 370/7; 455/59; 364/754

[56] References Cited

U.S. PATENT DOCUMENTS

| 3,803,390 | 4/1974 | Schaepman | 364/754 X |
| 4,231,100 | 10/1980 | Eggermont | 375/26 X |
| 4,270,139 | 5/1981 | Flamm et al. | 358/23 |
| 4,295,223 | 10/1981 | Shutterly | 370/7 X |
| 4,335,395 | 6/1982 | Clarke | 358/11 |
| 4,355,326 | 10/1982 | Lee | 358/37 |

FOREIGN PATENT DOCUMENTS 0021640 2/1980 Japan ..................... 360/22

OTHER PUBLICATIONS

T. Fischer, "Digital VLSI Breeds Next-Generation TV Receivers", *Electronics*, Aug. 11, 1981, pp. 97—103.

ITT Semiconductors, *VLSI Digital TV System DIGIT 2000*, Aug. 1982, pp. 1—31.
W. Weltersbach et al., "Digitale Videosignalverarbeitung im Farbfernsehempfänger", *Fernseh Und Kino Technik*, 35 Jahrgang, Nr. 9/1981, Sep. 1981, pp. 317—23 (with translation).

*Primary Examiner*—John C. Martin
*Assistant Examiner*—Michael P. Dunnam
*Attorney, Agent, or Firm*—E. M. Whitacre; P. J. Rasmussen; C. A. Berard, Jr.

[57] ABSTRACT

A signal processing apparatus includes a scaling device for increasing the magnitude of a signal from a source to better use the dynamic range of processing apparatus, and to reduce the effects of noise and error sources. This is particularly useful in a television receiver where the maximum magnitude of the (B-Y) chrominance signal component of a composite video signal is smaller than that of the (R-Y) chrominance signal component. To provide improved resolution of the (B-Y) signal components, a gain scaling arrangement increases the magnitude of the (B-Y) signal component to more closely approximate that of the (R-Y) signal component. In a TV receiver having digital signal processing apparatus, a digital multiplier scales the digitized (B-Y) signal component thereby to reduce the errors inherent in processing digital data having a limited number of bits, especially where such processing includes rounding or truncating operations which can introduce additional errors or decrease resolution.

20 Claims, 5 Drawing Figures

SCALING DEVICE AS FOR QUANTIZED B-Y SIGNAL

The present invention relates to signal processing apparatus for increasing the magnitude of certain signals.

The present invention, although one of general applicability, is particularly advantageous when employed in the chrominance signal processing section of a color television (TV) receiver. Such receivers separate video signals into luminance and chrominance signals, and the chrominance section further separates the chrominance signals into chrominance components, for example, (R-Y) and (B-Y) components. For signals in the NTSC television system used in the United States, the transmitted luminance signal magnitude is between zero and 100 IRE units. In forming the color video signal for transmission, the magnitude of the (B-Y) chrominance component is modified by a factor of 0.493 and the (R-Y) chrominance component is modified by a factor 0.877 in order to restrict maximum signal amplitude overshoots to levels within the ranges of both the transmitter and the receiver. Thus, for a saturated blue signal, the maximum (B-Y) component vector magnitude of 89 IRE units is modified by the factor 0.493 so that the maximum transmitted (B-Y) magnitude is approximately 43.9 IRE units. Similarly, for a saturated red signal, the maximum (R-Y) component vector magnitude of 70 IRE units is modified by the factor 0.877 so that the maximum transmitted (R-Y) magnitude is approximately 61.4 IRE units. These signals can be either positive or negative in polarity.

The receiver, however, must restore the (B-Y) and (R-Y) components to 89 and 70 IRE units, respectively, in order to produce a displayed picture accurately reproducing saturated blue and saturated red portions of the transmitted pictures. Conventionally, this restoration is provided as a final processing operation by selecting the relative weighting coefficients provided by a color signal matrix. The color signal matrix weights and combines the luminance signals and the chrominance component signals to produce red R, green G and blue B signals in standardized proportions. These R, G and B signals are applied to the kinescope to produce the picture display. Unfortunately, the (B-Y) component, which is received having a relatively lesser magnitude (i.e. ±43.9 IRE units), must produce the greatest display drive signal (i.e. ±89 IRE units) so that noise or errors introduced by such processing will tend to be more noticeable to a viewer than will errors in the (R-Y) component signal. This problem is aggravated where similar or common circuitry is employed to process (R-Y) and (B-Y) signals because the dynamic range of such circuitry must be designed to accept the larger amplitude (R-Y) signals. As a result, the (B-Y) signals do not fully utilize the available dynamic range of the processing circuitry. To reduce these problems, it is desirable to increase the magnitude of the (B-Y) component signal relative to that of the (R-Y) component signal, and to do so at a relatively early stage in its processing, rather than at the end thereof.

The above-described problem is aggravated in a TV receiver employing digital signal processing circuitry because the quantizing resolution inherent in a digitized signal limits the numbers of different levels of R, G and B signals which can ultimately be developed. Consider, for example, a system employing a seven-bit (128 level) analog-to-digital converter (ADC) to digitize an analog video signal range between the tip of the synchronizing signal (31 40 IRE units) and maximum white level (+100 IRE units). The resulting quantizing resolution is about 140/127 = 1.10 IRE units per step. The 43.9 IRE unit (B-Y) signals correspond to about 39 digital steps and the 61.4 IRE units (R-Y) signals correspond to about 55 digital steps. This illustrates that the magnitude of the (B-Y) signals is significantly less than that of the (R-Y) signals.

The most severe problem arises, however, due to limited quantization in digital signal processing and in reconverting the quantized signals to analog signals. Consider, for example, a TV digital signal processing system in which the (R-Y) and (B-Y) digital signals are limited to six bits (64 levels). Since the digital signals have to reproduce both positive and negative signal excursions, one digital level is the zero level leaving 63 non-zero valued digital levels. Further, because the positive and negative peak magnitudes are symmetrical, only ±31 digital levels are usable for signal excursions (i.e. 62 non-zero levels).

Assuming that the scaling of the (R-Y) digital signals is optimized to fully encompass the available range of digital levels, then equivalently scaled (B-Y) digital signals will encompass only [(43.9 IRE units)/(61.4 IRE units)]×(±31) levels=±22.16 digital levels so that only ±22 levels are actually utilized. When the chrominance signals are restored to full level as output signals, the (B-Y) component signal, for example, will encompass ±89 IRE units but will be constrained to the central ±22 levels of the (B-Y) digital chrominance signal. Thus, the output quantizing resolution is about 4.05 IRE units per step which is significantly and undesirably large and can cause noticeable color contours in the TV picture. These contours cause the picture to have an artificial appearance of the sort evident in a paint-by-number picture.

If the (B-Y) component is increased to occupy the entire ±31-level range, then the output quantizing resolution significantly improves to 2.87 IRE units per step. But this cannot be done simply by multiplying the (B-Y) signal to increase its magnitude range because to do so would merely substitute ±22 different ones of the ±31 available levels spread over the entire ±31-level range for the ±22 levels in the center thereof. Thus, some additional processing is required so that more of the available digital levels are employed to accurately represent the (B-Y) chrominance component.

Accordingly, the present invention comprises a source of signals having magnitudes less than some level, a signal processor, and a scaling device for increasing the magnitudes of the signals according to the magnitude of the signals from the source. The increased magnitude signals are then processed to produce output signals.

One feature of the present invention increases the level of a quantized signal by a factor to more closely encompass the range of available quantization levels. Another feature of the present invention increases the level of one signal to more closely approximate that of another signal and provides scaling to counteract that increase in the one signal when the two signals are combined.

IN THE DRAWING

FIG. 1 is a schematic diagram in block diagram form of digital signal processing apparatus including the present invention; and FIGS. 2, 3, 4 and 5 are schematic diagrams of particular arrangements useful in the apparatus of FIG. 1.

In the drawing, arrows having a slash mark represent signal paths for multiple-bit parallel digital signals having the number of bits indicated by the numeral proximate the slash mark.

It is noted that an N-bit digital signals has $2^N$ possible magnitudes or levels. These levels can be organized to correspond to zero and $(2^N-1)$ non-zero magnitudes. In the case of a "symmetrical" signal, these magnitudes can be organized to correspond to a central zero value, and $(2^{N-1})$ magnitudes of one polarity and $(2^{N-1}-1)$ values of an opposite polarity. In the description herein, the exemplary six-bit digital signals (i.e. N=6) are of the sort having a central zero value, unless specifically stated otherwise. Further, the digital signals herein are considered to be symmetrical about the zero value and so only $(2^{N-1}-1)$ magnitudes of each polarity are actually available for use (i.e. only 31 positive and 31 negative magnitudes are actually available). Therefore, it is necessary to bear in mind that the ratio factor K used herein can have different values depending upon the organization of the magnitudes represented by the digital signals. It is further noted that the present invention is applicable to quantized signals in general, of which digital signals are an example.

FIG. 1 shows a digital signal processing arrangement for a color TV receiver. Analog composite video signals ACV are converted into seven-bit digital video signals DV by analog-to-digital converter (ADC) 10. ADC 10 samples video signal ACV at four-times the frequency of the color subcarrier signal, i.e. $4f_{sc}=4\times 3.58$ MegaHertz in the NTSC system, in response to sampling clock signal $4f_{sc}$. ADC 10 also receives a "dither" signal $f_H2$ having an amplitude corresponding to one-half of the least significant bit (½ LSB) value of the digital word for the purpose of increasing the apparent quantizing resolution to approximate that of an eight-bit ADC. Signals $4f_{sc}$ and $f_H/2$ are developed as described below. Unless indicated otherwise, digital signal processing is performed at the rate of the sampling signal $4f_{sc}$ which is phase and frequency locked to the color subcarrier signal $f_{sc}$.

Seven-bit digital video signals DV are applied to digital luminance processor 12 which performs operations such as filtering out the chrominance components to produce the luminance signals, peaking the digital luminance signals and multiplying the digital luminance signals to adjust the contrast level of the resulting picture. Processor 12 produces processed seven-bit digital luminance signals Y which are converted into corresponding analog luminance signals Y' by digital-to-analog converter (DAC) 44.

Seven-bit digital video signals DV are applied to digital deflection and synchronization processor 14 which develops the various horizontal and vertical drive signals and synchronizing signals required for signal processing, deflection and picture display functions. In particular, processor 14 develops dither signals $f_H/2$ at one-half the horizontal line rate, i.e. signal $f_H/2$ is "high" for one horizontal line and is "low" for the next line. Processor 14 develops color key pulse CKP which is "low" (enabling) during each occurrence of the color subcarrier reference burst signal which is included in the horizontal blanking intervals of the video signals.

Seven-bit digital video signals DV are applied to chrominance digital bandpass filter 16 which passes the chrominance components of digital video signal DV. Digital filter 16 is, for example, a bandpass filter to pass only signals near the color subcarrier frequency $f_{sc}$. Because this filter includes several accumulators (adders) it produces thirteen-bit output filtered digital chrominance signals and exhibits a peak gain of about sixty-four times.

The filtered digital chrominance signals from filter 16 are adjusted to a standardized magnitude by digital automatic chrominance control (ACC) gain block 18 which provides attenuation by a factor of at least two and truncates the signals to six bits. The six-bit output digital signals from ACC gain block 18 are standardized in magnitude by a negative feedback loop including burst sampler and comparator 20. In response to color key pulse CKP, sampler 20 samples the color subcarrier reference burst signal portion of the six-bit digital chrominance signals produced by ACC gain block 18. These samples are compared to a reference level, e.g., to a level representing the nominal magnitude of the color subcarrier reference burst signal. As a result of that comparison, burst sampler and comparator 20 applies a gain control signal to ACC gain block 18 to set its gain (more specifically, to set its attenuation) to standardize the magnitude of the color subcarrier reference burst signal. This attenuation setting is maintained thereafter to also adjust the magnitude of the chrominance signals produced by ACC gain block 18. So as to avoid overrange values of the (R-Y) digital signals, which are of larger magnitude than are the (B-Y) digital signals, the maximum range of the (R-Y) digital signals is standardized at less than the equivalent of ±31 digital levels. For purposes of the following description, this is assumed to be ±27 digital levels.

Digital chroma signal demodulator 22 separates the six-bit standardized digital chrominance signals from ACC gain block 18 into quadrature chrominance signal components (R-Y) and (B-Y). Because (R-Y) and (B-Y) components are simply alternate samples in the sequence of digital chrominance signals, demodulator 22 can be a simple demultiplexer.

The six-bit (R-Y) and (B-Y) component digital signals of the color subcarrier reference burst portion are compared in phase to the color subcarrier clock signal $f_{sc}$ by phase comparator 24 in response to color key pulse CKP. Phase comparator 24 develops a signal responsive to the phase error between the actual phase of the $f_{sc}$ sampling signal and the desired phase thereof relative to the color subcarrier reference burst signal. Phase comparator 24 also filters this phase error signal and applies it to clock generator 26 which includes a voltage controlled oscillator (VCO) operating at the frequency $4f_{sc}$. The frequency of the VCO is adjusted thereby to be at exactly four times the color subcarrier frequency and in phase lock therewith. Clock generator 26 further includes a digital divider to divide the sampling signal $4f_{sc}$ by four to produce clock signal $f_{sc}$.

Returning to the digital chrominance signal processing path, the six-bit demodulated (R-Y) chrominance component signals produced by demodulator 22 encompass only the central ±27 levels of the possible ±31 levels of a six-bit signal. Accordingly, the demodulated (B-Y) component signals encompass (43.9/61.4)×27=19.3 levels of which ±19 levels actually are produced. For the reasons set forth previously, it is particularly desirable to increase the number of levels encompassed by the (B-Y) component. The digital levels encompassed by the (B-Y) signal can be expressed as a number K which is the ratio of the number of digital levels actually produced to the number of levels possible. Thus, for the (B-Y) component signal, K=19/31=0.613. The ±19 digital levels encompassed by the (B-Y) signal correspond to the central ±19 levels and zero.

The demodulated (R-Y) component signal is low-pass filtered by the (R-Y) digital comb filter 28 which produces a six-bit filtered (R-Y) signal. It is noted that filter 28 includes at least one adder and thus produces seven-bit output signals, however, only six-bits of its output signals are used.

The demodulated (B-Y) component signal is low-pass filtered by the (B-Y) digital comb filter 30 which includes at least one adder and produces a seven-bit filtered (B-Y) signal. Digital filter 30 is, for example, a relatively simple comb filter of the sort shown in FIG. 2. Six-bit input signals are applied to one input of digital adder 62 and to the input of 1H delay device 60. Delay device 60 is, for example, a FIFO dynamic random access memory (RAM) which provides a delay equal to the time of one horizontal line (1H) by cyclically developing 227 addresses in response to the clock signal $f_{sc}$, in the NTSC system. The delayed six-bit signal from delay device 60 is applied to the second input of adder 62 which produces a seven-bit sum signal. Digital filter 28 is of similar type to that illustrated for filter 30 except that only six-bits of the seven-bit output signal are used.

Conventionally, as illustrated for the (R-Y) signal, only six-bits of the filtered (B-Y) signal are used as is illustrated by the connection from filter 30 shown in phantom in FIG. 1. In accordance with the present invention, however, the seven-bit filtered (B-Y) component signal developed by the operation of digital filter 30 can be used to the advantage described previously.

To that end, (B-Y) digital multiplier 32 is interposed to scale the magnitude of the (B-Y) component signals to encompass a significantly larger number of the ±31 levels possible for these six-bit digital signals. Multiplier 32 can increase the (B-Y) signal magnitudes by a factor not exceeding 1/K=31/19=1.63 without causing an over range condition to occur, i.e. without exceeding ±31 levels for six-bit signals. Because digital multipliers are generally complex devices and require large areas on integrated circuits, it is desirable to employ the simplest multiplier structure consistent with the desired increase in the magnitude of the (B-Y) signal.

Figure 3:
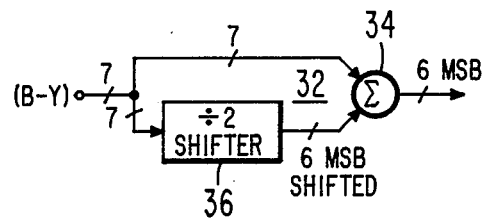

Multiplication by a factor 1.5 is satisfactorily close to, but does not exceed, the factor 1/K=1.63 and can be implemented by the relatively simple shift-and-add multiplier 32 shown in FIG. 3. The seven-bit (B-Y) signal is applied to a first input of digital adder 34 and to the input of divide-by-two shift register 36. Shifter 36 shifts the (B-Y) signals one bit position to the right (i.e. shifts down) to divide by two and applies the divided (B-Y) signal to a second input of adder 34. Although adder 34 produces a number which could, in the general case, be eight bits, in this specific case it is seven bits and the six most significant bits (MSB) thereof are employed so as to be compatible with subsequent processing circuitry which is configured for six-bit digital signals.

The improvement can be evaluated as follows. The six-bit (B-Y) component signals from demodulator 22 encompass ±19 of ±31 possible levels, or about 61% of the available range. The seven-bit filtered (B-Y) signals from digital filter 30 will encompass ±38 of ±63 possible levels. The operation of digital multiplier 32 adds 38/2=19 additional levels so that the seven-bit multiplier (B-Y) signals encompass 38+19=±63 possible levels, which is over 90% of the available range. Using only the six MSB thereof and ignoring the LSB results in modified (B-Y) signals encompassing ±28 of the ±31 possible levels, which is about 90% of the available range and which retains the advantage of the present invention.

The modified six-bit (B-Y) signals from digital multiplier 32 and the six-bit filtered (R-Y) signals from digital filter 28 are applied to saturation multiplier and multiplexer 40 shown in FIG. 1 for further processing. Saturation multipler and multiplexer 40 multiplexes the (R-Y) and (B-Y) signals in response to the clock signal $f_{sc}$. Multiplier 40, for example, employs one digital multiplier to adjust the magnitudes of the (R-Y) and (B-Y) signals in accordance with control input signals for color saturation (SAT). The two six-bit signals representing (R-Y) and (B-Y) modified for SAT (12 bits total) are multiplexed sequentially over one cycle of the clock signals $f_{sc}$ which includes four cycles of sampling clock $4f_{sc}$, i.e. the (R-Y) and (B-Y) signals are transmitted sequentially as four groups of three bits. This beneficially reduces the number of integrated circuit pins required from twelve to four (three for signals and one for the clock signal $f_{sc}$) when multiplexer-multiplier 40 is in one integrated circuit and demultiplexer 42 is in another integrated circuit. It is further consistent with the data rates of the chrominance signals which are at the $4f_{sc}$ sampling signal rate through bandpass filter 16 and ACC gain block 18 and are at the $f_{sc}$ clock signal rate in filters 28 and 30.

Chrominance demultiplexer 42 receives and demultiplexes the four groups of three bits to reform six-bit (R-Y) and (B-Y) digital chrominance signals in response to clock signal $f_{sc}$. These demultiplexed (R-Y) and (B-Y) six-bit signals are respectively converted to analog (R-Y)' and (B-Y)' signals by digital-to-analog converters 46 and 48.

Analog RGB matrix 50 receives analog luminance signals Y' and analog chrominance signals (R-Y)' and (B-Y)' to develop analog color signals R, G and B. Matrix 50 is modified from a conventional matrix to counteract the imbalance which would otherwise result owing to the multiplication of the (B-Y) digital signals by a factor 1.5 by digital multiplier 32. This can be accomplished either by increasing the (B-Y)' weighting resistor value by a factor 1.5 (thereby reducing its signal contribution by 1/1.5) or by decreasing the Y' and (R-Y)' weighting resistor values by a factor 1/1.5 (thereby increasing their signal contributions by 1.5).

The formulas for analog RGB matrix 50 without the present invention are:

$$R = 1.14(R-Y) + Y \tag{1}$$

$$G = -0.58(R-Y) - 0.38(B-Y) + Y \tag{2}$$

$$B = 2.03(B-Y) + Y \tag{3}$$

in the NTSC system. It is noted that the constants 1.14 and 2.03 are the reciprocals of the attenuation factors 0.877 and 0.493, respectively, referred to in the second paragraph hereof.

Figure 5:
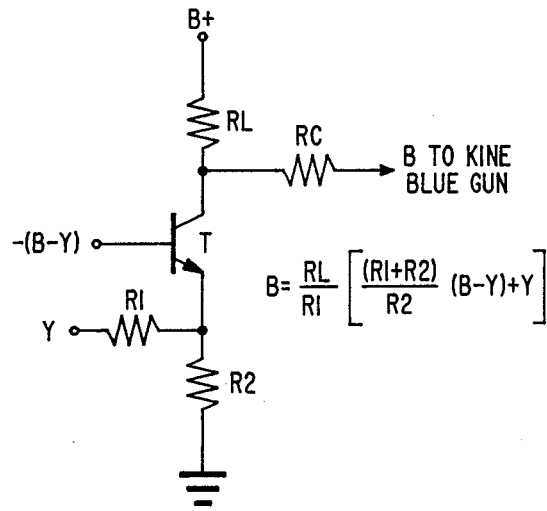

The portion of analog matrix 50 developing the blue color signal B in response to the analog chrominance signal (B-Y)' and the analog luminance signal Y' is shown in FIG. 5. Transistor T serves as a common-emitter amplifier with respect to signal −(B-Y) and as a common-base amplifier with respect to signal Y. Output signals B are developed across collector load resistor RL and are coupled to the blue gun of a kinescope via isolation resistor RC. Emitter circuit resistors R1 and R2 establish the overall amplifier gain in cooperation with RL and further proportion the relative contributions of the (B-Y) and Y signals to the blue-gun signals B in accordance with the equation included in FIG. 5.

Absent the present invention, the values of R1 and R2 are selected so that (R1+R2)/R2=2.03 to satisfy equation (3) above. In accordance with the present invention, increasing the magnitude of the (B-Y) component signal by a factor 1.5, matrix 50 includes scaling to approximately counteract the increased (B-Y) magnitude. Thus, R1 and R2 are selected in accordance with the present invention so that (R1+R2)/R2=2.03/1.5=1.35. Similar scaling with respect to the (B-Y) signal is included in the portion of matrix 50 developing green color signal G with respect to the (B-Y) contribution thereto.

Modifications are contemplated within the scope of the present invention as set forth in the claims following. For example, digital multiplier 32 may be arranged to obtain convenient multiplication factors while still requiring only shifters and adders. Factors conveniently available by shifting, e.g. $\frac{1}{2}$, $\frac{1}{4}$, $\frac{1}{8}$, etc., may be combined to produce a desired multiplying factor. In the embodiment described herein, one additional shifter producing $\frac{1}{8}$ scaling could be coupled to adder 34 to obtain a multiplying factor equal to $1+\frac{1}{2}+\frac{1}{8}=1\frac{5}{8}=1.625$ which is substantially the maximum factor of 1.63 calculated above.

Figure 4:
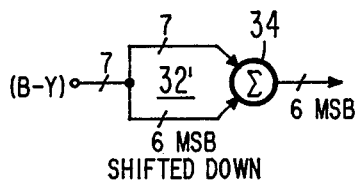

Multiplier 32 can be further simplified as shown by multiplier 32' in FIG. 4 wherein the function of shifter 36 is provided by coupling the bits of the (B-Y) signals to bit lines of the input of adder 34 but with correspondingly lesser bit weight. For example, only the six MSB of the (B-Y) signal are connected to adder 34 with the $2^7$ weight bit coupled to the $2^6$ weight input line, the $2^6$ weight bit coupled to the $2^5$ weight input line, and so forth.

It is further contemplated that all the six-bit signals described herein be at least seven-bit signals. This modification requires known modifications to ACC gain block 18, burst sampler 20, demodulator 22, multiplier 32 and multiplexer 40, demultiplexer 42 and DACs 46 and 48 for seven-bit operation and to filters 28 and 30 for eight-bit operation. The six-bit apparatus described herein corresponds to digital signal processing integrated circuits for television receivers available from ITT Semiconductors, Intermetall, Freiburg, West Germany and described in an ITT Semiconductors brochure entitled *VLSI Digital TV System DIGIT* 2000, dated August 1982, which is incorporated herein by reference.

It is further contemplated that multiplier 40 perform a tint or hue adjustment in response to a viewer control input. Tint control is performed by rotating the (R-Y) and (B-Y) signals, which represent quadrature vectors, angularly by an angle α. This requires that multiplier 40 multiply the (B-Y) and (R-Y) digital signals by factors SAT cos α and SAT sin α and then combine the products according to known algebraic sum and difference equations. When the (B-Y) signal magnitudes are modified by multiplier 32 in accordance with the present invention, multiplier 40 must multiply by factors SAT cos α, K SAT cos α, SAT sin α and K SAT sin α. This modification to multiplier 40 requires the addition of two additional latches to store the two additional multiplication factors.

It is further contemplated that analog matrix 50 be replaced by a digital RGB matrix receiving digital luminance signals Y from luminance processor 12 and digital chrominance signals (R-Y) and (B-Y) from demultiplexer 42. Digital color signals R, G and B from the digital matrix are applied to three digital-to-analog converters which develop the analog color signals R, G and B.

What is claimed is:

1. Signal processing apparatus comprising:
   a source of substantially uniformly quantized signals having N possible levels, wherein the number of levels of said quantized signals utilized is KN, where N is a positive integer and K is a number between zero and unity;
   first processing means, coupled to said source, for processing said quantized signals, said processing including at least one operation producing modified quantized signals having more than N possible levels;
   scaling means, coupled to said processing means, for scaling said modified quantized signals by a predetermined factor having a value greater than unity but not exceeding 1/K; and
   second processing means, coupled to said scaling means, for developing output signals having not more than N possible levels in response to said scaled modified quantized signals,
   whereby said output signals utilize a number of levels exceeding said KN number of levels.

2. Signal processing apparatus comprising:
   a source of digital signals having N bits, wherein a number, $K(2^N)$, of uniformly spaced digital levels are utilized by said digital signals, N being a positive integer and K being a number between zero and unity;
   first digital processing means, coupled to said source, for digitally processing said digital signals, said digital processing including at least one operation producing modified digital signals having at least N+1 bits;
   digital multiplying means, coupled to said digital processing means, for multiplying said modified digital signals by a predetermined factor having a value greater than unity but not exceeding 1/K;
   means coupled to said multiplying means for reducing the number of bits in the signals provided by said multiplying means to N, wherein the number of digital levels utilized by said bit reduced signals exceeds $K(2^N)$; and
   second processing means, coupled to said bit reducing means, for developing output digital signals in response to the signals provided thereby.

3. The apparatus of claim 2 wherein said first digital processing means includes a digital filter having at least one digital adder.

4. The apparatus of claim 2 wherein said digital multiplying means includes:
   shifter means for shifting said modified digital signals to reduce the magnitude thereof by a factor $2^M$, where M is a positive integer; and adder means having first and second inputs for receiving said modified digital signals and said shifted modified digital signals, respectively, for developing the sum thereof as said multiplied modified digital signals.

5. The apparatus of claim 4 wherein said shifter means includes means for coupling bits of said modified digital signals to corresponding bit lines of said second input of said adder having lesser bit position weights by said factor $2^M$.

6. The apparatus of claim 2 wherein said bit reducing means includes at least one operation responsive to bits of said multiplied modified digital signals exclusive of the least significant bit thereof.

7. In a digital signal processing system including a source of first and second uniformly quantized digital signals utilizing respective first and second ranges of quantization levels, wherein the number of levels in said first and second ranges may be expressed as KN and LN respectively, N being an integer, K and L being numbers between zero and unity, and K being less than L, and means for combining said first and second quantized digital signals wherein said combined signals include distortion components related to the difference in the number of quantization levels utilized by said first and second quantized signals, apparatus comprising:

means coupled between said source and said combining means for reducing the magnitude of said quantization related distortion components including first scaling means for increasing the magnitude of said first quantized signals and the number of levels in said first range by a predetermined factor having a value greater than unity and not greater than L/K, the value of said factor being substantially independent of the instantaneous magnitude of said first digital signals;

wherein said combining means includes second scaling means for scaling the relative contributions of at least one of said scaled first digital signals and said second digital signals to approximately counteract any disproportionality caused by scaling said first signals by said predetermined factor.

8. The apparatus of claim 7 wherein said source includes a digital chrominance signal demodulator providing first and second digital chrominance component signals as said first and second digital signals, respectively.

9. The apparatus of claim 8 wherein said first and second digital chrominance component signals correspond to (B-Y) and (R-Y) chrominance signals.

10. The apparatus of claim 7 wherein said source includes a digital filter having at least one digital adder for producing said first digital signals.

11. The apparatus of claim 7 wherein said digital multiplying means includes:

shifter means for shifting said modified first digital signals to reduce the magnitude thereof by a factor $2^M$, where M is a positive integer; and adder means having first and second inputs for receiving said modified first digital signals and said shifted modified first digital signals, respectively, for developing the sum thereof as said multiplied modified first digital signals.

12. The apparatus of claim 11 wherein said shifter means includes means for coupling bits of said modified first digital signals to corresponding bit lines of said second input of said adder having lesser bit position weights by said factor $2^M$.

13. The apparatus of claim 7 wherein said combining means includes digital-to-analog converting means for developing first and second analog signals corresponding to said multiplied modified first digital signals and to said second digital signals.

14. The apparatus of claim 13 wherein said scaling means includes an analog matrix to which said first and second analog signals are applied for developing said output signals.

15. A method for processing digital signals to increase the number of the possible digital levels of an N-bit digital signals which are utilized comprising the steps of:

(a) receiving said digital signal utilizing $K2^N$ of its $2^N$ possible uniformly spaced digital levels, where N is a positive integer and K is a number between zero and unity;

(b) digitally processing said digital signals to develop modified digital signals having at least N+1 bits;

(c) multiplying said modified digital signals by a factor greater than unity and not exceeding 1/K; and (d) developing output digital signals having not more than N bits in response to said multiplied modified digital signals, whereby said output digital signals utilize a number of digital levels exceeding said $K2^N$ number of digital levels.

16. The method of claim 15 wherein said step (b) comprises the steps of:

(e) delaying said digital signals; and (f) adding said delayed digital signals and said digital signals to develop said modified digital signals.

17. The method of claim 15 wherein said step (c) comprises the steps of:

(g) shifting said modified digital signals to reduce the magnitude thereof by a factor $2^M$, where M is a positive integer; and (h) adding said shifted modified digital signals and said modified digital signals to develop said multiplied modified digital signals.

18. The method of claim 15 wherein said step (d) comprises the step of truncating bits of said multiplied modified digital signals other than the N most significant bits thereof.

19. In a signal processing system including a source of first and second substantially uniformly quantized signals utilizing respective first and second ranges of quantization levels, wherein the number of quantization levels in said first range is smaller than the number of quantization levels in said second range, and means for combining said first and second quantized signals wherein said combined signals include distortion components related to the difference in the number of quantization levels utilized by said first and second quantized signals, apparatus comprising:

means coupled between said source and said combining means for reducing the magnitude of said quantization related distortion components including first scaling means for increasing the magnitude of said first quantized signals and the number of levels in said first range by a predetermined factor having a value greater than unity and not exceeding the ratio of the numbers of quantization levels in said respective second and first ranges, said value being substantially independent of the instantaneous magnitudes of said first and second quantized signals; and second scaling means coupled to said combining means for scaling the magnitude of at least one of said first and second quantized signals to approximately counteract any disproportionality caused by the increasing of the magnitude of said first quantized signals by said first scaling means.

20. In a digital video signal processing system including a source of digital composite video signals having first and second chrominance signal components modulating a suppressed carrier signal in quadrature, the maximum magnitude of said first chrominance signal component being K times the maximum magnitude of said second chrominance signal component, K being a number between zero and unity, apparatus comprising:

chrominance signal demodulating means coupled to said source for providing first and second digital signals corresponding to said first and second chrominance signal components;

digital multiplying means coupled to said demodulating means for multiplying said first digital signals by a predetermined factor greater than unity and not greater than 1/K; and combining means, coupled to said demodulating means and to said digital multiplying means, for developing at least one output signal in response to said multiplied first digital signals and to said second digital signals, said combining means including:

scaling means for scaling the relative contributions to said output signals of at least one of said multiplied first digital signals and said second digital signals to approximately counteract any disproportionality caused by multiplying said first signals by said predetermined factor.

* * * * *